United States Patent
Yin et al.

(10) Patent No.: US 11,991,337 B2
(45) Date of Patent: May 21, 2024

(54) IMAGE PIXEL COLOR CAST CORRECTION

(71) Applicant: Zhuhai Pantum Electronics Co., Ltd., Zhuhai (CN)

(72) Inventors: Aiguo Yin, Zhuhai (CN); Yangxiao Ma, Zhuhai (CN); Yan Sun, Zhuhai (CN)

(73) Assignee: ZHUHAI PANTUM ELECTRONICS CO., LTD., Zhuhai (CN)

( * ) Notice: Subject to any disclaimer, the term of this patent is extended or adjusted under 35 U.S.C. 154(b) by 361 days.

(21) Appl. No.: 17/404,330

(22) Filed: Aug. 17, 2021

(65) Prior Publication Data

US 2022/0053107 A1    Feb. 17, 2022

(30) Foreign Application Priority Data

Aug. 17, 2020   (CN) .......................... 202010826966.6

(51) Int. Cl.
*H04N 1/60* (2006.01)
*G06T 5/00* (2006.01)
(Continued)

(52) U.S. Cl.
CPC ............... *H04N 1/608* (2013.01); *G06T 5/00* (2013.01); *G06T 7/90* (2017.01); *H04N 1/58* (2013.01); *G06T 2207/10008* (2013.01)

(58) Field of Classification Search
CPC ........ H04N 1/608; H04N 1/58; H04N 1/4097; H04N 1/60; G06T 5/001; G06T 7/90; G06T 2207/10008
See application file for complete search history.

(56) References Cited

U.S. PATENT DOCUMENTS 6,367,908 B1    4/2002  Serra et al.
2003/0206307 A1*   11/2003  Handley .................. H04N 1/56
                                              358/1.9
(Continued)

FOREIGN PATENT DOCUMENTS

CN      101308573 A    11/2008
CN      109743472 A     5/2019
(Continued)

OTHER PUBLICATIONS

Zunling Huang et al., "Modified Adaptive Image Smoothing Algorithm", Journal of Shandong Institute of Architecture and Engineering, vol. 4, Dec. 30, 1998.

*Primary Examiner* — Christopher Wait
(74) *Attorney, Agent, or Firm* — Anova Law Group, PLLC

(57) ABSTRACT

An image processing method, an image forming apparatus, and a storage medium are provided in embodiments of the present disclosure. The image processing method includes acquiring a first color component value and a second color component value of each pixel of a to-be-processed image in a preset color space; determining a color cast pixel according to the first color component value and the second color component value of each pixel; and performing pixel correction on each color cast pixel to obtain a corrected to-be-processed image. In the technical solutions of various embodiment of the present application, the color cast pixel in the to-be-processed image is determined by the first color component value and the second color component value of the pixel, and the pixel correction is performed on the color cast pixel, which removes colored noise in the printed image and improves image printing quality.

18 Claims, 4 Drawing Sheets

Acquiring a first color component value and a second color component value of each pixel of a to-be-processed image in a preset color space — S201

Determining a color cast pixel according to the first color component value and the second color component value of each pixel — S202

Performing pixel correction on each color cast pixel to obtain a corrected to-be-processed image — S203

(51) Int. Cl.
*G06T 7/90* (2017.01)
*H04N 1/58* (2006.01)

(56) References Cited

U.S. PATENT DOCUMENTS

2004/0160615 A1* 8/2004 Rumph ................. H04N 1/608
　　　　　　　　　　　　　　　　　　　　　　358/1.9
2009/0226082 A1* 9/2009 Li ............................ H04N 1/58
　　　　　　　　　　　　　　　　　　　　　　358/1.9

FOREIGN PATENT DOCUMENTS

CN　　　111127370 A　　5/2020
WO　　2017119134 A1　　7/2017

* cited by examiner

Configured neighborhood table

| $X1_{11}$ $X2_{11}$ | $X1_{12}$ $X2_{12}$ | $X1_{13}$ $X2_{13}$ |
|---|---|---|
| $X1_{21}$ $X2_{21}$ | $X1_{22}$ $X2_{22}$ | $X1_{23}$ $X2_{23}$ |
| $X1_{31}$ $X2_{31}$ | $X1_{32}$ $X2_{32}$ | $X1_{33}$ $X2_{33}$ |

Color cast value table

| $index_{11}$ | $index_{12}$ | $index_{13}$ |
|---|---|---|
| $index_{21}$ | $index_{22}$ | $index_{23}$ |
| $index_{31}$ | $index_{32}$ | $index_{33}$ |

FIG. 4

Determining a color cast determination value of the current pixel according to the color cast value of each pixel in the preset neighboring area — S3061

When the color cast determination value of the current pixel is less than a preset repair threshold, determining that the current pixel is the color cast pixel — S3062

FIG. 5

IMAGE PIXEL COLOR CAST CORRECTION

CROSS-REFERENCE TO RELATED APPLICATIONS

This application claims priority to Chinese Patent Application No. 202010826966.6, filed on Aug. 17, 2020, the entire content of which is incorporated herein by reference.

TECHNICAL FIELD

The present disclosure generally relates to the field of image processing technology and, more particularly, relates to an image processing method, an image forming apparatus, and a storage medium.

BACKGROUND

When an image forming apparatus, such as a color copier, performs color scanning or color copying on grayscale or black-and-white originals, colored edges or noise may appear on the edges of corresponding black text portions.

In the existing technology, in order to eliminate colored edges and noise, multiple options may be configured in a control panel corresponding to the image forming apparatus, allowing users to select different copying modes, such as a receipt copying mode or a black-and-white copying mode, for different types of originals. However, for the users who are not familiar with the operation of the image forming apparatus, before the originals are printed, the manual operation manner by configuring the copying modes through the control panel may be not convenient.

SUMMARY

One aspect of the present disclosure provides an image processing method. The image processing method includes acquiring a first color component value and a second color component value of each pixel of a to-be-processed image in a preset color space; determining a color cast pixel according to the first color component value and the second color component value of each pixel; and performing pixel correction on each color cast pixel to obtain a corrected to-be-processed image.

Another aspect of the present disclosure provides an image processing apparatus. The image processing apparatus includes a pixel value acquisition module, configured to acquire a first color component value and a second color component value of each pixel of a to-be-processed image in a preset color space; a color cast pixel determination module, configured to determine a color cast pixel according to the first color component value and the second color component value of each pixel; and a pixel correction module, configured to perform pixel correction on each color cast pixel to obtain a corrected to-be-processed image.

Another aspect of the present disclosure provides an image forming apparatus. The image forming apparatus includes a memory, for storing computer-executable instructions; and at least one processor, coupled with the memory and configured, when the computer-executable instructions being executed, to perform an image processing method. The image processing method includes acquiring a first color component value and a second color component value of each pixel of a to-be-processed image in a preset color space; determining a color cast pixel according to the first color component value and the second color component value of each pixel; and performing pixel correction on each color cast pixel to obtain a corrected to-be-processed image.

Another aspect of the present disclosure provides a non-transitory computer-readable storage medium. The computer-readable storage medium contains program instructions for, when being executed by a processor, performing an image processing method. The method includes acquiring a first color component value and a second color component value of each pixel of a to-be-processed image in a preset color space; determining a color cast pixel according to the first color component value and the second color component value of each pixel; and performing pixel correction on each color cast pixel to obtain a corrected to-be-processed image.

Other aspects of the present disclosure can be understood by those skilled in the art in light of the description, the claims, and the drawings of the present disclosure.

According to the image processing method, the image processing apparatus, the image forming apparatus, and the storage medium which are provided by various embodiments of the present application, color cast pixels in the to-be-processed image may be automatically detected according to the first color component values and the second color component values of the to-be-processed image, and the color correction may further be automatically performed on the color cast pixels. Therefore, the colored noise on a printed or copied image may be removed, the quality of the printed image may be improved, the image processing may be implemented without manual operation of the users, and the image processing operation may be highly convenient.

BRIEF DESCRIPTION OF THE DRAWINGS

The drawings herein are incorporated into the specification and constitute a part of the specification, which show exemplary embodiments conforming to the present application, and are used together with the specification to describe the principle of the present disclosure.

FIG. 4 illustrates a schematic of a preset neighboring area and color cast values of all pixels of the preset neighboring area in one embodiment shown in FIG. 3 of the present disclosure;

FIG. 5 illustrates a flowchart of S306 in one embodiment shown in FIG. 3 of the present disclosure;

Through the above-mentioned drawings, specific embodiments of the present application have been shown, which are described in more details hereinafter. These drawings and descriptions are not intended to limit the scope of the concept of the present disclosure in any way, but to describe the concept of the present disclosure for those skilled in the art by referring to specific embodiments.

DETAILED DESCRIPTION

Exemplary embodiments are described in detail herein, and examples thereof are shown in the accompanying drawings. When the following description refers to the drawings, unless otherwise indicated, same numbers in different drawings indicate same or similar elements. The implementation manners described in the following exemplary embodiments do not represent all implementation manners consistent with the present disclosure; rather, they are merely examples of apparatuses and methods consistent with certain aspects of the present disclosure as detailed in the appended claims.

The technical solutions of the present disclosure and how the technical solutions of the present disclosure solve the above-mentioned technical problems are described in detail below with specific embodiments. The following specific embodiments may be combined with each other, and same or similar concepts or processes may not be repeated in certain embodiments. Various embodiments of the present disclosure are described below in conjunction with the accompanying drawings.

The application scenarios of the exemplary embodiments of the present application are described hereinafter.

Figure 1:
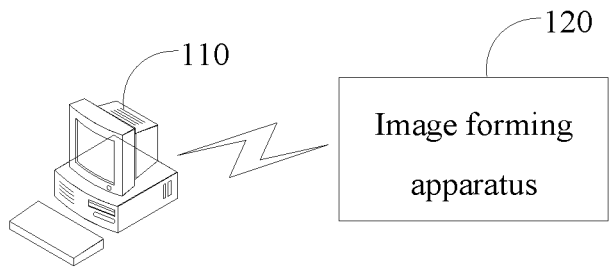
FIG. 1 illustrates an application scenario schematic of an image processing method according to various exemplary embodiments of the present disclosure.

FIG. 1 illustrates an application scenario schematic of an image processing method according to various exemplary embodiments of the present disclosure. As shown in FIG. 1, a user may send a grayscale or black-and-white document to an image forming apparatus 120 through a user terminal 110 to perform color printing of the document, or a user may place a black-and-white original on the image forming apparatus 120 for color scanning or color copying. The image forming apparatus 120 may perform image processing to meet the user's job requirement after receiving the document or the image data acquired after scanning the original. In order to avoid colored noise on the edges of the black text of the image after image processing, the user may configure the printing, copying or scanning modes through the control panel of the user terminal 110 according to the printing, copying or scanning needs. For example, when the color copying is performed on the black-and-white original, the black-and-white copying mode may be selected; or when color scanning is performed on a receipt, the receipt copying mode may be selected. However, the setting of the above-mentioned scanning or copying mode may not be convenient enough for the users who are not familiar with printer-related operations.

In order to solve the above-mentioned problem, various embodiments of the present application provide an image processing method which may automatically eliminate the image colored noise. The main concept of the technical solutions of the method is: automatically detecting color cast (i.e., deviation) pixels in the image according to the first color component value and the second color component value of each pixel of the to-be-processed image, and correcting the color cast pixels, which may implement the automatic colored noise removal, improve the image copying or scanning quality, improve the user experience, and may not require user's manual operation with high convenience.

Figure 2:
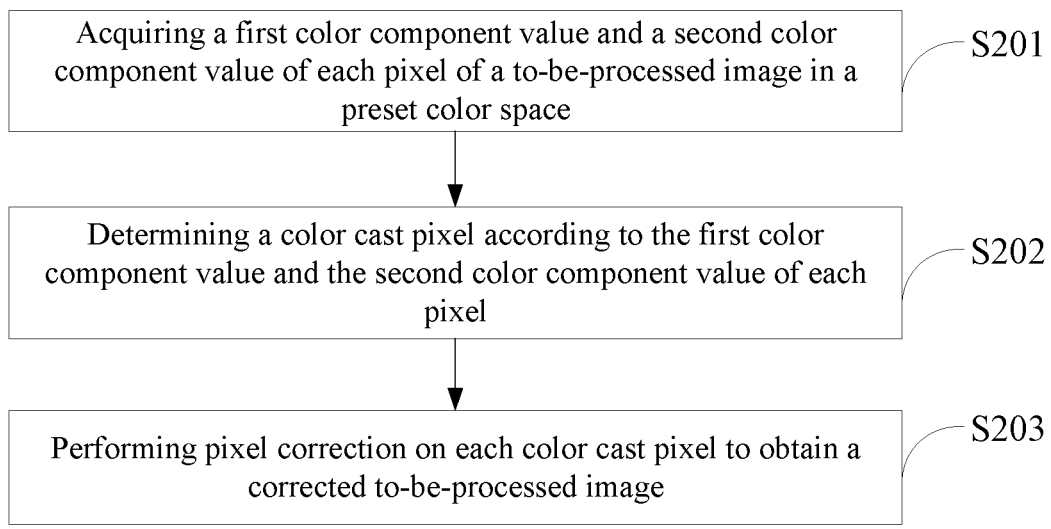
FIG. 2 illustrates a flowchart of an image processing method according to various exemplary embodiments of the present disclosure.

FIG. 2 illustrates a flowchart of an image processing method according to various exemplary embodiments of the present disclosure. The image processing method may be suitable for an image forming apparatus, such as a printer, a copier, a scanner, and/or the like. As shown in FIG. 2, the image processing method provided in one embodiment may include the following steps.

In S201, the first color component value and the second color component value of each pixel of a to-be-processed image in a preset color space may be acquired.

The to-be-processed image may be a corresponding image acquired by scanning the original by the user or an image to-be-printed received from a PC. The to-be-processed image may be an image which needs to be printed, copied or scanned by the image forming apparatus. The preset color space may be a YCrCb color space, a Lab color space, and/or the like. When the preset color space is the YCrCb color space, the first color component value and the second color component value may be a Cr value and a Cb value, respectively; and when the preset color space is the Lab color space, the first color component value and the second color component value may be an a value and a b value, respectively.

For example, when the color space of the to-be-processed image is the YCrCb color space, the pixel value of the pixel may include a Y value, a Cr value, and a Cb value.

When the color space of the to-be-processed image is the Lab color space, the pixel value of the pixel may include an L value, an a value and a b value, where the L value may represent a brightness value, and the a value and the b value may represent color component values.

The color space is a three-dimensional coordinate system, and each color is represented by a point in the coordinate system. The YCrCb color space may include a Y channel, a Cr channel and a Cb channel. The pixel value of the pixel may be described by the value of each channel, that is, the Y value, the Cr value and the Cb value. The Y value may represent brightness, that is, the grayscale value; and the Cr value and the Cb value may be used to represent chroma, that is, color and saturation. The YCrCb color space may also be referred to as a YUV color space, the Cr value may also be referred to as a U value, and the Cb value may also be referred to as a V value.

For example, the to-be-processed image may be an image acquired by scanning the original by the image forming apparatus. The user's original may be a black-and-white original or a gray-scale original, that is, an achromatic original.

For example, when the color space of the to-be-processed image is another color space, such as an RGB color space, the color space of the to-be-processed image may need to be converted.

Optionally, the preset color space is the YCrCb color space. Acquiring the first color component value and the second color component value of each pixel of the to-be-processed image may include performing the YCrCb color space conversion on the to-be-processed image to obtain the Cr value and the Cb value of each pixel of the to-be-processed image.

For example, the color space of the to-be-processed image is normally the RGB color space. Therefore, the to-be-processed image may need to be converted from the RGB color space to the YCrCb color space, thereby acquiring the Y value, the Cr value, and the Cb value of each pixel.

Furthermore, the to-be-processed image may be converted from the RGB color space to the YCrCb color space based on the first preset conversion relational expression. The first preset conversion relational expression may be:

$$Y = \text{coeff11}*R + \text{coeff12}*G + \text{coeff13}*B$$

$$Cr = \text{coeff21}*R + \text{coeff22}*G + \text{coeff23}*B$$

$$Cb = \text{coeff31}*R + \text{coeff32}*G + \text{coeff33}*B$$

where coeff11, coeff12 and coeff13 respectively denote a red (R) weight coefficient, a green (G) weight coefficient and a blue (B) weight coefficient on the Y channel; coeff21, coeff22 and coeff23 respectively denote a red weight coefficient, a green weight coefficient and a blue weight coefficient on the Cr channel; and coeff31, coeff32 and coeff33 respectively denote a red weight coefficient, a green weight coefficient and a blue weight coefficient on the Cb channel.

For example, the value of each weight in the first preset conversion relational expression may correspond to different values in different calculation modes.

Exemplarily, coeff11 is 0.299, coeff12 is 0.587, coeff13 is 0.114, coeff21 is −0.147, coeff22 is −0.289, coeff23 is 0.436, coeff31 is 0.615, coeff32 is −0.515, and coeff33 is −0.100.

Furthermore, the to-be-processed image may be converted from the RGB color space to the YCrCb color space based on the second preset conversion relational expression. The second preset conversion relational expression may be:

$$Y=f11*R+f12*G+f13*B+n_1$$

$$Cr=f21*R+f22*G+f23*B+n_2$$

$$Cb=f31*R+f32*G+f33*B+n_3$$

where f11, f12 and f13 respectively denote a red weight coefficient, a green weight coefficient and a blue weight coefficient on the Y channel; f21, f22 and f23 respectively denote a red weight coefficient, a green weight coefficient and a blue weight coefficient on the Cr channel; f31, f32 and f33 respectively denote a red weight coefficient, a green weight coefficient and a blue weight coefficient on the Cb channel; and $n_1$ is the first constant on the Y channel, $n_2$ is the second constant on the Cr channel, and $n_3$ is the third constant on the Cb channel.

Exemplarily, f11 is 0.299, coeff12 is 0.587, coeff13 is 0.114, $n_1$ is 0, f21 is −0.500, f22 is −0.4187, f23 is 0.0813, $n_2$ is 128, f31 is −0.1687, f32 is −0.3313, f33 is 0.500, $n_3$ is 128.

Furthermore, the above-mentioned preset space may also include other color spaces, such as the Lab color space. The preset space may only need to be converted into the Lab color space according to the existing conversion expression.

In S202, the color cast (i.e., deviation) pixel may be determined according to the first color component value and the second color component value of each pixel.

The color cast pixel may indicate that there is a deviation in the color of the pixel, and may be a pixel that needs to be corrected or processed.

Exemplarily, it is assumed that a pixel $I_1$ is a gray-scale pixel in the user original, however, it is indeed a color pixel on the image scanned by the image forming apparatus, that is, the to-be-processed image, so that the pixel $I_1$ may be a color cast pixel.

Optionally, determining the color cast pixel according to the first color component value and the second color component value of each pixel may include: for each pixel, determining whether a current pixel is a color cast pixel according to the first color component values and the second color component values of all pixels in a preset neighboring area of the current pixel.

The size of the preset neighboring area may be set by the user, or may be a default size. The size of the preset neighboring area may also be determined according to the size of the to-be-processed image. The current pixel may be any pixel of the to-be-processed image.

Exemplarily, the preset neighboring area may be a neighboring area of 3×3, 5×5 or other sizes centered on the current pixel.

For example, whether the current pixel is a color cast pixel may be determined according to the average value of the first color component values and the average value of the second color component values in the preset neighboring area of the current pixel.

Furthermore, whether the current pixel is a color cast pixel may be determined according to the first color component values, the second color component values, the average value of the first color component values, and the average value of the second color component values of all pixels in the preset neighboring area of the current pixel. By traversing all pixels of the entire to-be-processed image, all color cast pixels in the to-be-processed image may be detected.

In S203, pixel correction may be performed on each color cast pixel to obtain a corrected to-be-processed image.

For example, the color cast pixel may be corrected according to the average value of the first color components and the average value of the second color components in the preset neighboring area corresponding to the color cast pixel, thereby removing the colored noise generated by the color cast in the to-be-processed image to improve the image quality.

The image processing method provided by various embodiments of the present application may automatically detect the color cast pixels in the to-be-processed image according to the first color component values and the second color component values of the to-be-processed image, and further automatically perform the color correction on the color cast pixels. Therefore, the colored noise on the printed or copied image may be removed to improve the image quality, the image processing may be implemented without the user's manual operation, and the image processing operation may be highly convenient.

Figure 3:
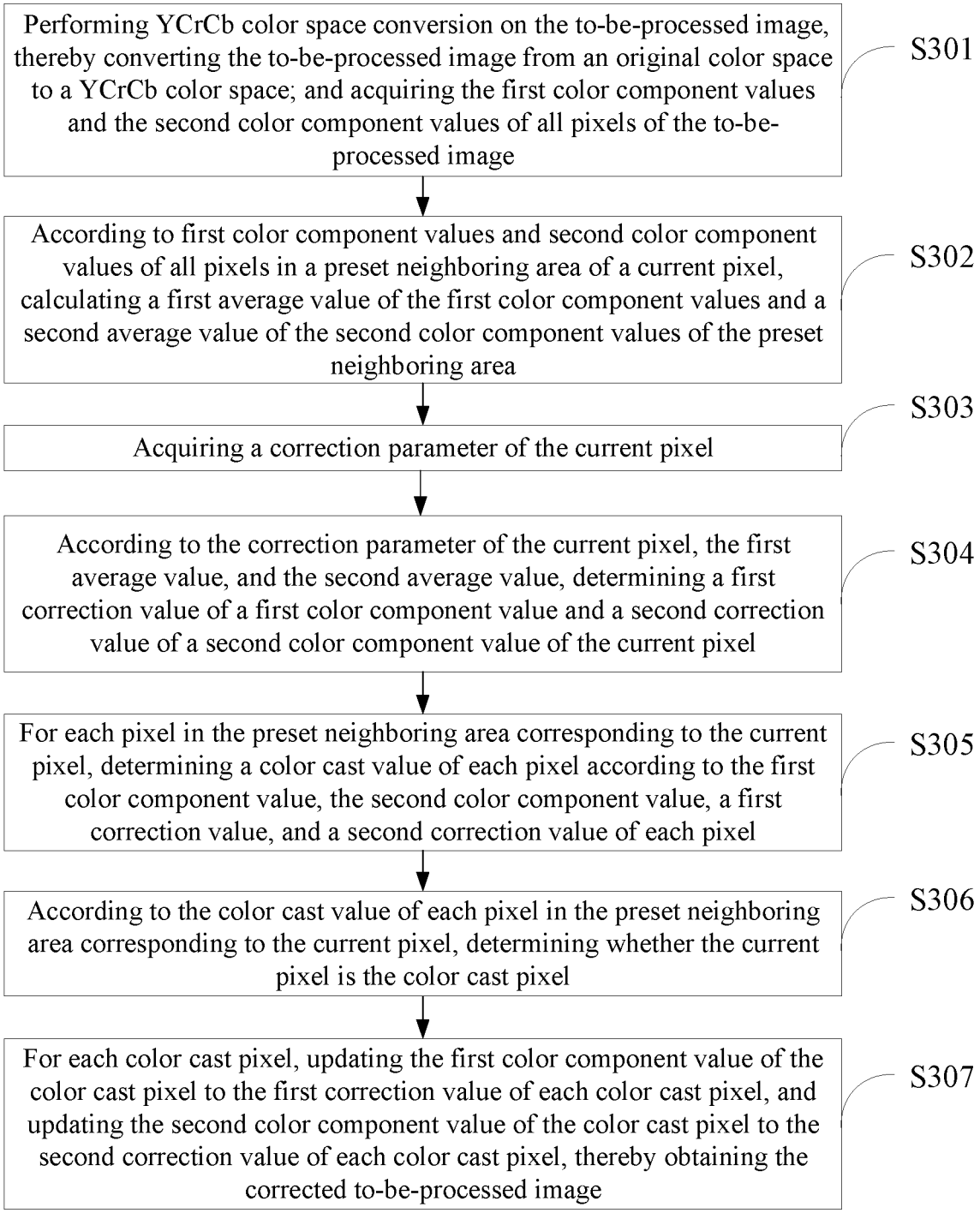
FIG. 3 illustrates a flowchart of another image processing method according to various exemplary embodiments of the present disclosure.

FIG. 3 illustrates a flowchart of another image processing method according to various exemplary embodiments of the present disclosure. As shown in FIG. 3, the image processing method provided in one embodiment is to divide S201, S202 and S203 based on the image processing method provided in various embodiments shown in FIG. 2, and add a step of restoring the image color space after S203. The image processing method provided in one embodiment may include the following steps.

In S301, the conversion of the YCrCb color space or the Lab color space may be performed on the to-be-processed image, thereby converting the to-be-processed image from an original color space to the YCrCb color space or the Lab color space; and the first color component values and the second color component values of all pixels of the to-be-processed image may be acquired.

The first color component value may be the Cr value or the a value, and the second color component value is the Cb value or the b value. The original color space of the to-be-processed image may be the RGB color space. That is, it is needed to convert the to-be-processed image from the RGB color space to the YCrCb color space or Lab color space based on the existing conversion formula. In such way, the Y value, the Cr value and the Cb value or the L value, the a value and the b value of each pixel of the to-be-processed image after conversion may be acquired. The Y value, the Cr value, the Cb value, the L value, the a value, and the b value may be collectively referred to as pixel values.

In S302, according to the first color component values and the second color component values of all pixels in the preset neighboring area of the current pixel, the first average value of the first color component values and the second average value of the second color component values of the preset neighboring area may be calculated.

For example, the expression of the first average value $\overline{X1}$ of the first color component values of the preset neighboring area may be:

$$\overline{X1} = \mathrm{Sum}X1 / N^2$$

$$\mathrm{Sum}X1 = \sum_{i=1}^{N}\sum_{j=1}^{N} X1_{ij}$$

where the size of the preset neighboring area is N×N, the value of N includes 3, 5, 7, or other values, and $X1_{ij}$ is the first color component value of the pixel $A_{ij}$ in an i-th row and a j-th column in the preset neighboring area.

The expression of the second average value $\overline{X2}$ of the second color component values of the preset neighboring area may be:

$$\overline{X2} = \mathrm{Sum}X2 / N^2$$

$$\mathrm{Sum}X2 = \sum_{i=1}^{N}\sum_{j=1}^{N} X2_{ij}$$

where $X2_{ij}$ is the second color component value of the pixel $A_{ij}$ in the i-th row and the j-th column in the preset neighboring area.

In S303, a correction parameter of the current pixel may be acquired.

The correction parameter may be a parameter set manually, or may also be determined according to the pixel values of all pixels in the preset neighboring area of the current pixel. The pixel value may be the gray value of the pixel, or the Y value, the Cr value, and the Cb value corresponding to the YCrCb color space, or the a value, the b value, and the L value corresponding to the Lab color space.

Furthermore, the value range of the correction parameter may be about 1-255.

In S304, according to the correction parameter of the current pixel, the first average value of the first color component values, and the second average value of the second color component values, the first correction value of the first color component value and the second correction value of the second color component value of the current pixel may be determined.

For example, the expression of the first correction value $X1_{ij}'$ of the current pixel $A_{ij}$ may be:

$$X1_{ij}' = \overline{X1}/n_{ij}$$

The expression of the second correction value $X2_{ij}'$ of the current pixel $A_{ij}$ may be:

$$X2_{ij}' = \overline{X2}/n_{ij}$$

where, $n_{ij}$ is the correction parameter of the current pixel $A_{ij}$.

In S305, for each pixel in the preset neighboring area corresponding to the current pixel, the color cast value of each pixel may be determined according to the first color component value, the second color component value, the first correction value and the second correction value of each pixel.

For example, the color cast value may be determined based on the absolute value of the difference between the first color component value and the first correction value, the absolute value of the difference between the second color component value and the second correction value, and the absolute value of the difference between the first color component value and the second color component value.

Furthermore, the expression of the color cast value $\mathrm{index}_{ij}$ of the pixel $A_{ij}$ may be:

$$\mathrm{index}_{ij} = \mathrm{abs}(\mathrm{abs}(X1_{ij}' - X1_{ij}) + \mathrm{abs}(X2_{ij}' - X2_{ij}) - \mathrm{abs}(X2_{ij} - X1_{ij}))$$

where the function abs denotes taking the absolute value.

Exemplarily, FIG. 4 illustrates a schematic of the preset neighboring area and color cast values of all pixels of the preset neighboring area in one embodiment shown in FIG. 3 of the present disclosure. As shown in FIG. 4, N=3, the preset neighboring area of the current pixel includes 9 pixels, and the first color component values and the second color component values of all pixels are shown in the preset neighboring area table in FIG. 4; the current pixel is $A_{22}$, and its first color component value and second color component value are $X1_{22}$ and $X2_{22}$ respectively; and the color cast values corresponding to all pixels are shown in the color cast value table in FIG. 4.

In S306, according to the color cast value of each pixel in the preset neighboring area corresponding to the current pixel, whether the current pixel is a color cast pixel may be determined.

Optionally, FIG. 5 illustrates a flowchart of S306 in one embodiment shown in FIG. 3 of the present disclosure. S306 may include the following steps.

In S3061, a color cast determination value of the current pixel may be determined according to the color cast value of each pixel in the preset neighboring area.

The color cast determination value may be the average value or the median value of the color cast values of the preset neighboring area.

Optionally, the expression of the color cast determination value may be:

$$\mathrm{index}U_{ij} = \mathrm{indexSum}/N^2$$

$$\mathrm{indexSum} = \sum_{i=1}^{N}\sum_{j=1}^{N} \mathrm{index}_{ij}$$

where $\mathrm{index}U_{ij}$ is the color cast determination value of the current pixel $A_{ij}$; $N^2$ is the total number of pixels in the preset neighboring area of the current pixel $A_{ij}$; and indexSum is the sum of the color cast values of all pixels in the preset neighboring area.

In S3062, when the color cast determination value of the current pixel is less than a preset repair threshold, it is determined that the current pixel may be a color cast pixel.

The preset repair threshold repairTh may be a value set manually, such as 8, 16 and/or the like, and may also be determined according to all color cast values in the preset neighboring area, such as the maximum value, the average value and the like of the color cast values.

For example, if the color determination value of the current pixel $\mathrm{index}U_{ij} < \mathrm{repairTh}$, it is determined that the current pixel may be a color cast pixel which needs to be corrected; and if the color determination value of the previous pixel is $\mathrm{index}U_{ij} \geq \mathrm{repairTh}$, it is determined that the current pixel may not be a color cast pixel or a color pixel, where its original color information may need to be retained, that is, the original Cr value and Cb value or the original a value and b value may be retained, and may not be updated to the correction value.

In S307, for each color cast pixel, the first color component value of the color cast pixel may be updated to the first correction value of each color cast pixel, and the second color component value of the color cast pixel may be updated to the second correction value of each color cast pixel, thereby obtaining the corrected to-be-processed image.

In one embodiment, for the to-be-processed image that is converted into the YCrCb color space or Lab color space and according to each preset neighboring area centered by the current pixel: the first and second correction values of the current pixel may be determined based on the first average value of the Cr values, the second average value of the Cb values and the correction parameter in the preset neighboring area, or the first and second correction values of the current pixel may be determined according to the first average value of the a values, the second average value of the b values and the correction parameter in the preset neighboring area. As such, by using the difference between the pixel value of each pixel in the neighboring area and its correction value to determine whether the current pixel is a color cast pixel, the color cast detection accuracy can be increased. By further using the correction value to correct the pixel value of the color cast pixel, the automatic removal of image colored noise can be implemented to improve the image quality, and the whole process may not require human operation with high convenience.

Figure 6:
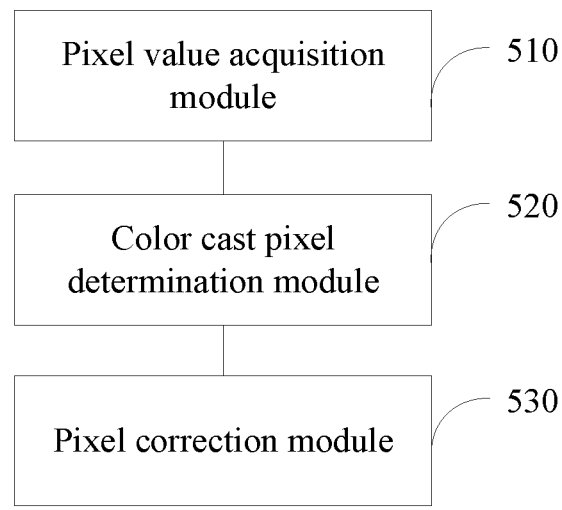
FIG. 6 illustrates a structural schematic of an image processing apparatus according to various exemplary embodiments of the present disclosure.

FIG. 6 illustrates a structural schematic of an image processing apparatus according to various exemplary embodiments of the present disclosure. As shown in FIG. 6, the image processing apparatus provided in one embodiment may include a pixel value acquisition module 510, a color cast pixel determination module 520, and a pixel correction module 530.

The pixel value acquisition module 510 may be configured to acquire the first color component value and the second color component value of each pixel of the to-be-processed image in the preset color space. The color cast pixel determination module 520 may be configured to determine the color cast pixel according to the first color component value and the second color component value of each pixel. The pixel correction module 530 may be configured to perform pixel correction on each color cast pixel to obtain the corrected to-be-processed image.

Optionally, the color cast pixel determination module 520 may be configured to: for each pixel, determine whether the current pixel is a color cast pixel according to the first color component value and the second color component value of each pixel in the preset neighboring area of the current pixel.

Optionally, the color cast pixel determination module 520 may include: an average value calculation unit, configured to, according to the first color component values and the second color component values of all pixels in the preset neighboring area of the current pixel, calculate the first average value of the first color component values and the second average value of the second color component values of the preset neighboring area; a correction parameter acquisition unit, configured to acquire the correction parameter of the current pixel; a correction value determination unit, configured to, according to the correction parameter of the current pixel, the first average value and the second average value, determine the first correction value of the first color component value and the second correction value of the second color component value of the current pixel; a color cast value determination unit, configured to, for each pixel in the preset neighboring area corresponding to the current pixel, determine the color cast value of each pixel according to the first color component value, the second color component value, the first correction value, and the second correction value of each pixel; and a color cast pixel determination unit, configured to, according to the color cast value of each pixel in the preset neighboring area corresponding to the current pixel, determine whether the current pixel is a color cast pixel.

Optionally, the color cast pixel determination unit may be configured to determine the color cast determination value of the current pixel according to the color cast value of each pixel in the preset neighboring area, and when the color cast determination value of the current pixel is less than the preset repair threshold, determine that the current pixel may be a color cast pixel.

Optionally, the expression of the color cast determination value may be:

$$\text{indexU}_{ij} = \text{indexSum}/N^2$$

where $\text{indexU}_{ij}$ is the color cast determination value of the current pixel $A_{ij}$; $N^2$ is the total number of pixels in the preset neighboring area of the current pixel $A_{ij}$; indexSum is the sum of the color cast values of all pixels in the preset neighboring area.

Optionally, the pixel correction module 530 may be configured to: for each color cast pixel, update the first color component value of the color cast pixel to the first correction value of the color cast pixel, and update the second color component value of the color cast pixel to the second correction value of the color cast pixel.

Optionally, the pixel value acquisition module 510 may be configured to perform the conversion of the YCrCb color space or the Lab color space on the to-be-processed image, thereby converting the to-be-processed image from the original color space to the YCrCb color space or the Lab color space, where the first color component value may be the Cr value or the a value, and the second color component value may be the Cb value or the b value.

Correspondingly, the pixel correction module 530 may further be configured to: after the corrected to-be-processed image is acquired, convert the corrected to-be-processed image from the YCrCb color space to the original color space. In addition, the Lab color space conversion may be performed on the to-be-processed image, and the color cast pixels in the Lab color space may be corrected.

Optionally, the color space of the to-be-processed image may be the RGB color space, and the image processing apparatus may further include: after the corrected to-be-processed image is acquired, converting the corrected to-be-processed image into the RGB color space by the pixel correction module.

Figure 7:
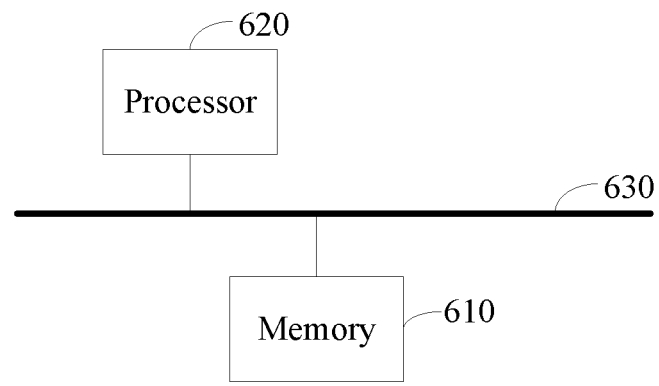
FIG. 7 illustrates a structural schematic of an image forming apparatus according to various exemplary embodiments of the present disclosure.

FIG. 7 illustrates a structural schematic of an image forming apparatus according to various exemplary embodiments of the present disclosure. As shown in FIG. 7, the image processing apparatus may include a memory 610 and at least one processor 620.

Computer programs, stored in the memory 610, may be configured to be executed by the processor 620 to implement the image processing method provided by any one of various embodiments corresponding to FIGS. 2-5 of the present application.

The memory 610 and the processor 620 may be connected through a bus 630.

The related description may be understood by referring to the related description and effects corresponding to the steps in FIGS. 2-5, which may not be described in detail herein.

Various embodiments of the present disclosure provide a non-transitory computer-readable storage medium on which computer programs are stored. The computer programs may be executed by the processor to implement the image processing method provided in any one of the embodiments corresponding to FIGS. 2-5 of the present disclosure.

The computer-readable storage medium may be a read only memory (ROM), a random access memory (RAM), a CD-ROM, a magnetic tape, a floppy disk, an optical data storage device, and/or the like.

In various embodiments provided in the present disclosure, it should be understood that the disclosed apparatus and method may be implemented in other manners. For example, the apparatus embodiments described above may merely be illustrative. For example, the division of modules may merely be a logical function division, and there may be other division manners in actual implementation. For example, multiple modules or components may be combined or integrated into another system, or some features may be omitted or may not be implemented. Furthermore, the displayed or discussed mutual coupling, direct coupling or communication connection may be indirect coupling or communication connection through some interfaces, devices or modules, and may also be in electrical, mechanical or other forms.

Those skilled in the art may easily think of other embodiments of the present disclosure after considering the specification and practicing the disclosure disclosed herein. The present disclosure may be intended to cover any modifications, uses or adaptive changes of the present disclosure. These modifications, uses, or adaptive changes may follow the general principles of the present disclosure and include common knowledge or conventional technical means in the technical field which are not disclosed in the present disclosure. The description and various embodiments may merely be regarded as exemplary, and the scope and spirit of the present disclosure may be referred to the appended claims.

It should be understood that the present disclosure may not be limited to the precise structure that has been described above and shown in the drawings, and various modifications and changes may be made without departing from the scope of the present disclosure. The scope of the present disclosure may merely be limited by the appended claims.

What is claimed is:

1. An image processing method, comprising:
acquiring a first color component value and a second color component value of each pixel of a to-be-processed image in a preset color space;
determining a color cast pixel according to the first color component value and the second color component value of each pixel, including:
according to first color component values and second color component values of all pixels in a preset neighboring area of a current pixel, calculating a first average value of the first color component values and a second average value of the second color component values of the preset neighboring area;
acquiring a correction parameter of the current pixel;
according to the correction parameter of the current pixel, the first average value, and the second average value, determining a first correction value of a first color component value and a second correction value of a second color component value of the current pixel, wherein for the current pixel, the first correction value equals the first average value divided by the correction parameter, and the second correction value equals the second average value divided by the correction parameter; and
performing pixel correction on each color cast pixel to obtain a corrected to-be-processed image.

2. The method according to claim 1, wherein determining the color cast pixel according to the first color component value and the second color component value of each pixel further includes:
for each pixel in the preset neighboring area corresponding to the current pixel, determining a color cast value of each pixel according to the first color component value, the second color component value, a first correction value, and a second correction value of each pixel; and
according to the color cast value of each pixel in the preset neighboring area corresponding to the current pixel, determining whether the current pixel is the color cast pixel.

3. The method according to claim 2, wherein according to the color cast value of each pixel in the preset neighboring area corresponding to the current pixel, determining whether the current pixel is the color cast pixel includes:
determining a color cast determination value of the current pixel according to the color cast value of each pixel in the preset neighboring area; and
when the color cast determination value of the current pixel is less than a preset repair threshold, determining that the current pixel is the color cast pixel.

4. The method according to claim 3, wherein an expression of the color cast determination value is:

$$\text{index}U_{ij} = \text{indexSum}/N^2$$

wherein $\text{index}U_{ij}$ is the color cast determination value of the current pixel $A_{ij}$; i is a row index, and j is a column index; $N^2$ is a total number of pixels in the preset neighboring area of the current pixel $A_{ij}$; and indexSum is a sum of color cast values of all pixels in the preset neighboring area.

5. The method according to claim 2, wherein performing the pixel correction on each color cast pixel includes:
for each color cast pixel, updating a first color component value of each color cast pixel to a first correction value of each color cast pixel, and updating a second color component value of each color cast pixel to a second correction value of each color cast pixel.

6. The method according to claim 1, wherein acquiring the first color component value and the second color component value of each pixel of the to-be-processed image in the preset color space includes:
performing a YCrCb color space conversion or a Lab color space conversion on the to-be-processed image, thereby converting the to-be-processed image from an original color space to the YCrCb color space or the Lab color space, wherein the first color component value is a Cr value or an a value, and the second color component value is a Cb value or a b value; and
after acquiring the corrected to-be-processed image, converting the corrected to-be-processed image from the YCrCb color space or the Lab color space to the original color space.

7. An image forming apparatus, comprising:
a memory, for storing computer-executable instructions; and
at least one processor, coupled with the memory and configured, when the computer-executable instructions being executed, to perform an image processing method, the image processing method comprising:
acquiring a first color component value and a second color component value of each pixel of a to-be-processed image in a preset color space;

determining a color cast pixel according to the first color component value and the second color component value of each pixel, including:
according to first color component values and second color component values of all pixels in a preset neighboring area of a current pixel, calculating a first average value of the first color component values and a second average value of the second color component values of the preset neighboring area;
acquiring a correction parameter of the current pixel;
according to the correction parameter of the current pixel, the first average value, and the second average value, determining a first correction value of a first color component value and a second correction value of a second color component value of the current pixel, wherein for the current pixel, the first correction value equals the first average value divided by the correction parameter, and the second correction value equals the second average value divided by the correction parameter; and
performing pixel correction on each color cast pixel to obtain a corrected to-be- processed image.

8. The apparatus according to claim 7, wherein determining the color cast pixel according to the first color component value and the second color component value of each pixel further includes:
for each pixel in the preset neighboring area corresponding to the current pixel, determining a color cast value of each pixel according to the first color component value, the second color component value, a first correction value, and a second correction value of each pixel; and
according to the color cast value of each pixel in the preset neighboring area corresponding to the current pixel, determining whether the current pixel is the color cast pixel.

9. The apparatus according to claim 8, wherein according to the color cast value of each pixel in the preset neighboring area corresponding to the current pixel, determining whether the current pixel is the color cast pixel includes:
determining a color cast determination value of the current pixel according to the color cast value of each pixel in the preset neighboring area; and
when the color cast determination value of the current pixel is less than a preset repair threshold, determining that the current pixel is the color cast pixel.

10. The apparatus according to claim 9, wherein an expression of the color cast determination value is:

$$\text{index}U_{ij} = \text{indexSum}/N^2$$

wherein $\text{index}U_{ij}$ is the color cast determination value of the current pixel $A_{ij}$; i is a row index, and j is a column index; $N^2$ is a total number of pixels in the preset neighboring area of the current pixel $A_{ij}$; and indexSum is a sum of color cast values of all pixels in the preset neighboring area.

11. The apparatus according to claim 8, wherein performing the pixel correction on each color cast pixel includes:
for each color cast pixel, updating a first color component value of each color cast pixel to a first correction value of each color cast pixel, and updating a second color component value of each color cast pixel to a second correction value of each color cast pixel.

12. The apparatus according to claim 7, wherein acquiring the first color component value and the second component value of each pixel of the to-be-processed image in the preset color space includes:
performing a YCrCb color space conversion or a Lab color space conversion on the to-be-processed image, thereby converting the to-be-processed image from an original color space to the YCrCb color space or the Lab color space, wherein the first color component value is a Cr value or an a value, and the second color component value is a Cb value or a b value; and
after acquiring the corrected to-be-processed image, converting the corrected to-be-processed image from the YCrCb color space or the Lab color space to the original color space.

13. A non-transitory computer-readable storage medium, containing program instructions for, when being executed by a processor, performing an image processing method, the image processing method comprising:
acquiring a first color component value and a second color component value of each pixel of a to-be-processed image in a preset color space;
determining a color cast pixel according to the first color component value and the second color component value of each pixel, including:
according to first color component values and second color component values of all pixels in a preset neighboring area of a current pixel, calculating a first average value of the first color component values and a second average value of the second color component values of the preset neighboring area;
acquiring a correction parameter of the current pixel;
according to the correction parameter of the current pixel, the first average value, and the second average value, determining a first correction value of a first color component value and a second correction value of a second color component value of the current pixel, wherein for the current pixel, the first correction value equals the first average value divided by the correction parameter, and the second correction value equals the second average value divided by the correction parameter; and
performing pixel correction on each color cast pixel to obtain a corrected to-be-processed image.

14. The storage medium according to claim 13, wherein determining the color cast pixel according to the first color component value and the second color component value of each pixel further includes:
for each pixel in the preset neighboring area corresponding to the current pixel, determining a color cast value of each pixel according to the first color component value, the second color component value, a first correction value, and a second correction value of each pixel; and
according to the color cast value of each pixel in the preset neighboring area corresponding to the current pixel, determining whether the current pixel is the color cast pixel.

15. The storage medium according to claim 14, wherein according to the color cast value of each pixel in the preset neighboring area corresponding to the current pixel, determining whether the current pixel is the color cast pixel includes:
determining a color cast determination value of the current pixel according to the color cast value of each pixel in the preset neighboring area; and
when the color cast determination value of the current pixel is less than a preset repair threshold, determining that the current pixel is the color cast pixel.

16. The storage medium according to claim 15, wherein an expression of the color cast determination value is:

$$\text{index}U_{ij} = \text{indexSum}/N^2$$

wherein $\text{index}U_{ij}$ is the color cast determination value of the current pixel $A_{ij}$; i is a row index, and j is a column index; $N^2$ is a total number of pixels in the preset neighboring area of the current pixel $A_{ij}$; and indexSum is a sum of color cast values of all pixels in the preset neighboring area.

17. The storage medium according to claim 14, wherein performing the pixel correction on each color cast pixel includes:

for each color cast pixel, updating a first color component value of each color cast pixel to a first correction value of each color cast pixel, and updating a second color component value of each color cast pixel to a second correction value of each color cast pixel.

18. The storage medium according to claim 13, wherein acquiring the first color component value and the second color component value of each pixel of the to-be-processed image in the preset color space includes:

performing a YCrCb color space conversion or a Lab color space conversion on the to-be-processed image, thereby converting the to-be-processed image from an original color space to the YCrCb color space or the Lab color space, wherein the first color component value is a Cr value or an a value, and the second color component value is a Cb value or a b value; and after acquiring the corrected to-be-processed image, converting the corrected to-be-processed image from the YCrCb color space or the Lab color space to the original color space.

* * * * *